US012795685B2

(12) United States Patent
Lei et al.

(10) Patent No.: US 12,795,685 B2
(45) Date of Patent: Nov. 10, 2026

(54) METHOD AND APPARATUS FOR HARQ-ACK CODEBOOK DETERMINATION FOR MULTI-SLOT SCHEDULING

(71) Applicant: Lenovo (Beijing) Limited, Beijing (CN)

(72) Inventors: Haipeng Lei, Beijing (CN); Yu Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 264 days.

(21) Appl. No.: 18/293,955

(22) PCT Filed: Aug. 5, 2021

(86) PCT No.: PCT/CN2021/110729

§ 371 (c)(1),
(2) Date: Jan. 31, 2024

(87) PCT Pub. No.: WO2023/010379

PCT Pub. Date: Feb. 9, 2023

(65) Prior Publication Data

US 2024/0406972 A1 Dec. 5, 2024

(51) Int. Cl.

*H04W 72/232* (2023.01)
*H04L 1/1829* (2023.01)
*H04W 72/1273* (2023.01)

(52) U.S. Cl.

CPC ......... *H04W 72/232* (2023.01); *H04L 1/1861* (2013.01); *H04W 72/1273* (2013.01)

(58) Field of Classification Search

CPC ............ H04W 72/1273; H04W 72/232; H04L 1/1861

See application file for complete search history.

(56) References Cited

U.S. PATENT DOCUMENTS 10,541,785 B2 * 1/2020 Papasakellariou .... H04L 1/1812
2019/0349142 A1 * 11/2019 Aiba .................... H04L 1/1819
(Continued)

FOREIGN PATENT DOCUMENTS

CN 110149717 A 8/2019
CN 111436153 A 7/2020
(Continued)

OTHER PUBLICATIONS

"Extended European Search Report", EP Application No. 21952276.0, Feb. 24, 2025, 10 pages.
(Continued)

*Primary Examiner* — Kent Krueger

(74) *Attorney, Agent, or Firm* — FIG. 1 Patents

(57) ABSTRACT

Embodiments of the present disclosure relate to HARQ-ACK codebook determination. According to some embodiments of the disclosure, a method performed by a UE may include: receiving a set of first DCI formats for scheduling a first group of PDSCHs, wherein each of the first DCI formats schedules at least one PDSCH on a serving cell of the UE and indicates a first DAI, and the first DAI indicates an accumulative number of PDSCHs among the first group of PDSCHs; receiving a set of second DCI formats for scheduling a second group of PDSCHs, wherein each of the second DCI formats may schedule a maximum of one PDSCH on a serving cell of the UE and indicates a second DAI, and the second DAI indicates an accumulative number of PDCCH transmissions carrying the second DCI formats; and transmitting a HARQ-ACK codebook including a first HARQ-ACK sub-codebook for the first group of PDSCHs and a second HARQ-ACK sub-codebook for the second group of PDSCHs.

20 Claims, 8 Drawing Sheets

(56) References Cited

U.S. PATENT DOCUMENTS

| | | | | |
|---|---|---|---|---|
| 2022/0201724 | A1* | 6/2022 | Zhang | H04L 1/1896 |
| 2022/0201725 | A1* | 6/2022 | Liu | H04L 5/0053 |
| 2022/0217756 | A1* | 7/2022 | Wu | H04L 27/2636 |
| 2023/0031134 | A1* | 2/2023 | Lin | H04W 72/1273 |
| 2023/0171040 | A1* | 6/2023 | Gao | H04L 5/0044 370/329 |
| 2023/0309105 | A1* | 9/2023 | Yi | H04W 72/0446 |
| 2024/0031056 | A1* | 1/2024 | Rastegardoost | H04W 74/0833 |
| 2024/0057114 | A1* | 2/2024 | Lei | H04L 1/1896 |
| 2024/0073894 | A1* | 2/2024 | Lei | H04L 1/0061 |
| 2024/0236975 | A1* | 7/2024 | Yoshioka | H04L 1/1861 |

FOREIGN PATENT DOCUMENTS

| | | |
|---|---|---|
| CN | 112655257 A | 4/2021 |
| WO | WO2020072963 | 4/2020 |

OTHER PUBLICATIONS

Huawei, et al., “POSCH/PUSCH enhancements for 52-71GHz spectrum”, 3GPP TSG RAN WG 1 Meeting #105-e, R1-2104274, E-meeting, May 10 -27, 2021. [Retrieved from the Internet] <https://ftp.3gpp.org/tsg_ran/WG1_RL 1/TSGR1_ 105-e/Docs/R1-2104274.zip R1-2104274.docx>, May 2021, 10 pages.

LG Electronics, “POSCH/PUSCH enhancements to support NR above 52.6 GHz”, 3GPP TSG RAN WG1 #104b- e, R1-2103343, e-Meeting, Apr. 12-20, 2021.[Retrieved from the Internet] <https://ftp.3gpp.org/tsg_ran/WG1_RL1/TSGR1_104b-e/Docs/R1-2103343.zip R1-2103343.docx>, Apr. 2021, 22 pages.

Samsung, “POSCH/PUSCH enhancements for NR from 52.6 GHz to 71 GHz”, 3GPP TSG RAN WG1 #105-e, R1-2105299, e-Meeting, May 10-27, 2021. [Retrieved from the Internet] <https://ftp.3gpp.org/tsg_ran/WG1_RL 1/TSGR1_ 105-e/Docs/R1-2105299.zip R1-2105299.docx>, May 2021, 13 pages.

OPPO , “Remaining issues on HARQ enhancements for NR-U”, 3GPP TSG RAN WG1 #100-E, R1-2000472, Athens, Greece, retrieved from the internet <https://www.3gpp.org/ftp/tsg_ran/WG1_RL1/TSGR1_100_e/Docs>, Feb. 24, 2020, 11 pages.

PCT/CN2021/110729 , “International Preliminary Report on Patentability”, International Application No. PCT/CN2021/110729, Feb. 6, 2024, 5 pages.

PCT/CN2021/110729 , “International Search Report and Written Opinion”, International Application No. PCT/CN2021/110729, Apr. 25, 2022, 7 pages.

VIVO , “Remaining issues on HARQ operation for NR-U”, 3GPP TSG RAN WG1#103-e, R1-2008661, e-Meeting, retrieved from the internet Apr. 26, 2024 <https://www.3gpp.org/dynareport?code=TDocExMtg--R1-103-e--38734.htm>, Oct. 26, 2020, 6 pages.

* cited by examiner

METHOD AND APPARATUS FOR HARQ-ACK CODEBOOK DETERMINATION FOR MULTI-SLOT SCHEDULING

TECHNICAL FIELD

Embodiments of the present disclosure generally relate to wireless communication technology, and more particularly to hybrid automatic repeat request acknowledgement (HARQ-ACK) codebook determination.

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

In a wireless communication system, a user equipment (UE) may monitor a physical downlink control channel (PDCCH) in one or more search spaces. The PDCCH may carry downlink control information (DCI), which may schedule uplink channels, such as a physical uplink shared channel (PUSCH), or downlink channels, such as a physical downlink shared channel (PDSCH). A UE may transmit hybrid automatic repeat request acknowledgement (HARQ-ACK) feedback (e.g., included in a HARQ-ACK codebook) corresponding to PDSCH transmissions through a physical uplink control channel (PUCCH) or a physical uplink shared channel (PUSCH).

There is a need for handling HARQ-ACK codebook determination in a wireless communication system.

SUMMARY

Some embodiments of the present disclosure provide a method for wireless communication performed by a user equipment (UE). The method may include: receiving a set of first downlink control information (DCI) formats for scheduling a first group of physical downlink shared channels (PDSCHs), wherein each of the first DCI formats schedules at least one PDSCH on a serving cell of the UE and indicates a first downlink assignment indicator (DAI), and the first DAI indicates an accumulative number of PDSCHs among the first group of PDSCHs; receiving a set of second DCI formats for scheduling a second group of PDSCHs, wherein each of the second DCI formats may schedule a maximum of one PDSCH on a serving cell of the UE and indicates a second DAI, and the second DAI indicates an accumulative number of physical downlink control channel (PDCCH) transmissions carrying the second DCI formats; and transmitting a hybrid automatic repeat request acknowledgement (HARQ-ACK) codebook including a first HARQ-ACK sub-codebook for the first group of PDSCHs and a second HARQ-ACK sub-codebook for the second group of PDSCHs.

Some embodiments of the present disclosure provide a method for wireless communication performed by a user equipment (UE). The method may include: receiving a set of first downlink control information (DCI) formats, wherein each of the first DCI formats schedules at least one physical downlink shared channel (PDSCH) on a serving cell of the UE; receiving a set of second DCI formats, wherein each of the second DCI formats may schedule a maximum of one PDSCH on a serving cell of the UE; and transmitting a HARQ-ACK codebook for PDSCHs scheduled by the set of first DCI formats and the set of second DCI formats, wherein each DCI format of the set of first DCI formats and the set of second DCI formats indicates a downlink assignment indicator (DAI) indicating an accumulative number of PDSCHs among the PDSCHs scheduled by the set of first DCI formats and the set of second DCI formats.

Some embodiments of the present disclosure provide a method for wireless communication performed by a base station (BS). The method may include: transmitting a set of first downlink control information (DCI) formats for scheduling a first group of physical downlink shared channels (PDSCHs), wherein each of the first DCI formats schedules at least one PDSCH on a cell and indicates a first downlink assignment indicator (DAI), and the first DAI indicates an accumulative number of PDSCHs among the first group of PDSCHs; transmitting a set of second DCI formats for scheduling a second group of PDSCHs, wherein each of the second DCI formats may schedule a maximum of one PDSCH on a cell and indicates a second DAI, and the second DAI indicates an accumulative number of physical downlink control channel (PDCCH) transmissions carrying the second DCI formats; and receiving a HARQ-ACK codebook including a first HARQ-ACK sub-codebook for the first group of PDSCHs and a second HARQ-ACK sub-codebook for the second group of PDSCHs.

Some embodiments of the present disclosure provide a method for wireless communication performed by a base station (BS). The method may include: transmitting a set of first downlink control information (DCI) formats, wherein each of the first DCI formats schedules at least one physical downlink shared channel (PDSCH) on a cell; transmitting a set of second DCI formats, wherein each of the second DCI formats may schedule a maximum of one PDSCH on a cell; and receiving a HARQ-ACK codebook for PDSCHs scheduled by the set of first DCI formats and the set of second DCI formats, wherein each DCI format of the set of first DCI formats and the set of second DCI formats indicates a downlink assignment indicator (DAI) indicating an accumulative number of PDSCHs among the PDSCHs scheduled by the set of first DC formats and the set of second DCI formats.

Some embodiments of the present disclosure provide a UE. According to some embodiments of the present disclosure, the UE may include: a transceiver; and a processor coupled to the transceiver, wherein the transceiver and the processor may interact with each other so as to perform a method according to some embodiments of the present disclosure.

Some embodiments of the present disclosure provide a BS. According to some embodiments of the present disclosure, the BS may include: a transceiver; and a processor coupled to the transceiver, wherein the transceiver and the processor may interact with each other so as to perform a method according to some embodiments of the present disclosure.

Some embodiments of the present disclosure provide an apparatus.

According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
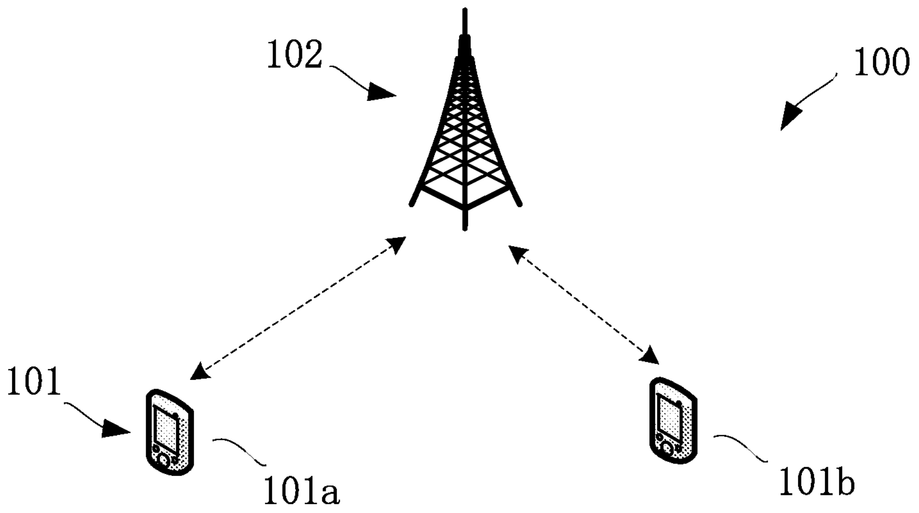
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101*a* and UE 101*b*) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BSs 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with 5G NR of the 3GPP protocol. For example, BS 102 may transmit data using an orthogonal frequency division multiple (OFDM) modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

NR Release 17 is designed to expand the frequency range to 71 GHz. Due to the phase noise effect at a high frequency band, higher subcarrier spacing (SCS) may be specified for the purpose of reliability. For example, 240 kHz SCS, 480 kHz SCS, 960 kHz SCS, and 1920 kHz SCS may be considered. It is known that the higher the SCS, the shorter the duration of a slot. For example, Table 1 below shows exemplary slot durations for different SCSs. It should be understood that Table 1 is only for illustrative purposes, and should not be construed as limiting the embodiments of the present disclosure.

TABLE 1

Slot durations for different SCSs

| $\mu$ | $\Delta f = 2^{\mu} \cdot 15$[KHz] | Slot duration |
|---|---|---|
| 0 | 15 | 1 ms |
| 1 | 30 | 0.5 ms |
| 2 | 60 | 0.25 ms |
| 3 | 120 | 0.125 ms |
| 4 | 240 | 0.0625 ms |
| 5 | 480 | 31.25 μs |
| 6 | 960 | 15.625 μs |

In the above Table 1, the SCS configuration μ is associated with an SCS (listed in the second column of Table 1). For example, "μ=3" may indicate an SCS of 120 kHz, and the slot duration for such SCS is 0.125 ms.

In NR Release 17, multi-slot PDSCH scheduling is supported. A DCI supporting multi-slot PDSCH may refer to a DL DCI where at least one entry of the time domain resource allocation (TDRA) table allows scheduling more than one PDSCH. When the multi-slot PDSCH scheduling is supported, a single DCI can schedule a plurality of PDSCHs on a serving cell for a UE. Each PDSCH may have an individual transport block(s) (TB(s)) and confined within a slot. In some embodiments of the present disclosure, the maximum number of PDSCHs that can be scheduled by a single DCI may be 8 for an SCS of 480 kHz and an SCS of 960 kHz.

In some embodiments of the present disclosure, the maximum number of PDSCHs that can be scheduled by a single DCI may be 4 for an SCS of 480 kHz. In some embodiments of the present disclosure, multi-slot PDSCH scheduling may or may not be supported for an SCS of 120 kHz.

Figure 2:
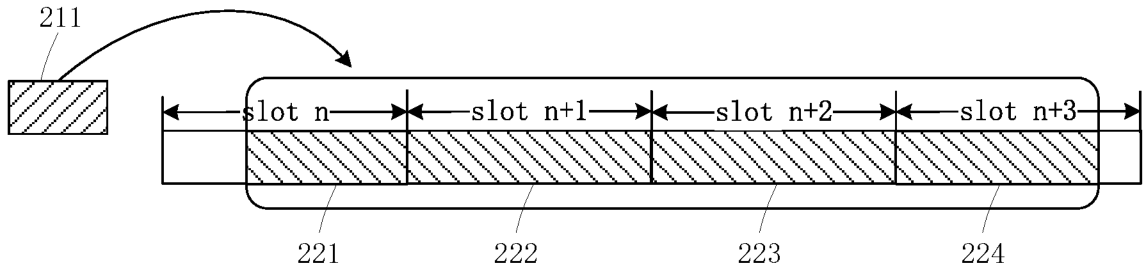
FIG. 2 illustrates a schematic diagram of a DCI format scheduling a plurality of DL transmissions in accordance with some embodiments of the present disclosure.

FIG. 2 illustrates a schematic diagram of a DCI format scheduling a plurality of DL transmissions in accordance with some embodiments of the present disclosure. As shown in FIG. 2, DCI format 211 may schedule four PDSCHs (e.g., PDSCHs 221-224) carrying four different TBs on multiple slots (e.g., slot n to slot n+3). For example, one PDSCH is transmitted on one slot. In this case, four HARQ processes are needed for the four PDSCHs.

It should be understood that FIG. 2 is only for illustrative purposes, and should not be construed as limiting the embodiments of the present disclosure. For example, a DCI format may schedule fewer or more PDSCHs or a PUSCH in some other embodiments of the present disclosure.

The multi-slot PDSCH scheduling may cause HARQ-ACK codebook ambiguity between a UE and a BS when a DCI format scheduling multiple PDSCHs is missed by the UE, which will be explained in the following text.

Figure 3:
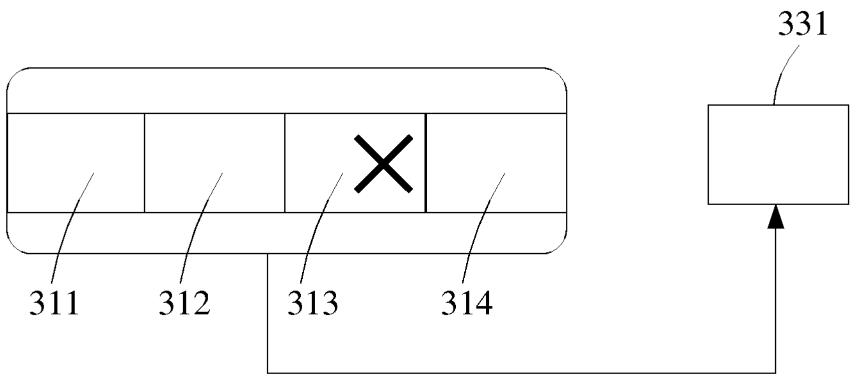
FIG. 3 illustrates a schematic diagram of HARQ-ACK codebook determination in accordance with some embodiments of the present disclosure.

FIG. 3 illustrates a schematic diagram of HARQ-ACK codebook determination in accordance with some embodiments of the present disclosure. It should be understood that FIG. 3 is only for illustrative purposes, and should not be construed as limiting the embodiments of the present disclosure.

Two types of HARQ-ACK codebooks may be defined for HARQ-ACK multiplexing for multiple received PDSCHs. One may be named a Type-1 HARQ-ACK codebook (also referred to as "semi-static HARQ-ACK codebook"), and another may be named a Type-2 HARQ-ACK codebook (also referred to as "dynamic HARQ-ACK codebook"). The definitions of the Type-1 HARQ-ACK codebook and Type-2 HARQ-ACK codebook are specified in 3GPP specifications. In the example of FIG. 3, it is assumed that the UE is configured with a single serving cell and a Type-2 HARQ-ACK codebook.

As shown in FIG. 3, a BS may schedule a plurality of PDSCHs to a UE via a plurality of DCI formats (e.g., DCI formats 311-314). The BS may indicate that the HARQ-ACK feedback for the plurality of PDSCHs is to be transmitted in the same PUCCH (e.g., PUCCH 331).

In some examples, each of DCI formats 311-314 may schedule one or more PDSCHs, and may indicate an accumulative number of PDCCH transmissions, up to the current serving cell and the current PDCCH monitoring occasion. For instance, DCI formats 311-314 may respectively indicate downlink assignment indicators (DAIs) (e.g., counter DAIs) having the values of 1, 2, 3, and 4. In some other embodiments of the present disclosure, the UE may be configured with carrier aggregation (CA), and the DCI format may further indicate a total DAI, which may denote the total number of PDCCH transmissions, up to the current PDCCH monitoring occasion.

Still referring to FIG. 3, when no error case happens, that is, the UE receives all DCI formats 311-314, the UE can generate a HARQ-ACK codebook including HARQ-ACK information bits (i.e., HARQ-ACK feedback) for all PDSCHs scheduled by the DCI formats 311-314. For example, assuming that the numbers of PDSCHs scheduled by DCI formats 311-314 are 2, 1, 3, and 2, respectively, the UE may generate a HARQ-ACK codebook {a0, a1, b0, c0, c1, c2, d0, d1}, where "a0" and "a1" are ACK or NACK bits corresponding to the PDSCHs scheduled by DCI format 311, "b0" is an ACK or NACK bit corresponding to the PDSCH scheduled by DCI format 312, "c0," "c1" and "c2" are ACK or NACK bits corresponding to the PDSCHs scheduled by DCI format 313, and "d0" and "d1" are ACK or NACK bits corresponding to the PDSCHs scheduled by DCI format 314.

In the case that the UE receives DCI formats 311, 312, and 314, but misses DCI format 313, the UE can identify that one DCI is missed between DCI formats 312 and 314 based on the respective DAI values (e.g., "2" and "4") of DC formats 312 and 314. However, the UE cannot identify how many PDSCHs are scheduled by the missing DCI format since the missing DCI format can schedule one or more PDSCHs. For example, the UE cannot know DCI format 313 has scheduled 3 PDSCHs. As a result, the UE cannot determine a correct HARQ-ACK codebook.

In some embodiments of the present disclosure, to solve the above problem. i.e., HARQ-ACK codebook ambiguity due to a missed DCI format(s), the UE may determine the number of HARQ-ACK information bits for the PDSCH(s) scheduled by a DCI format based on the maximum number of PDSCHs that can be scheduled by a single DCI format. For example, assuming that the maximum number of PDSCHs that can be scheduled by a single DCI format is 4, in the above error case where DCI format 313 is missed, the UE may generate a HARQ-ACK codebook {{a0, a1, NACK. NACK}, {b0, NACK, NACK, NACK}, {NACK, NACK. NACK. NACK}, {d0, d1, NACK, NACK}}. In these embodiments, a relatively high signaling overhead may be brought about.

In some embodiments of the present disclosure, to solve the above problem, instead of determining a DAI (e.g., the counter DAI or total DAI) per a DCI basis (hereinafter also referred to as "per-PDCCH counted DAI"), the value of the DAI may be determined per a PDSCH basis (hereinafter also referred to as "per-PDSCH counted DAI").

For example, each of DCI formats 311-314 may indicate an accumulative number of PDSCH transmissions, up to the current serving cell and the current PDCCH monitoring occasion. In some other embodiments of the present disclosure, the UE may be configured with CA, and a DCI format may further indicate a total DAI, which may denote the total number of PDSCH transmissions, up to the current PDCCH monitoring occasion. In this way, even when a DCI format is missed by the UE, the UE can still determine the number of PDSCHs scheduled by the missing DCI based on the per-PDSCH counted DAIs.

For example, assuming that the numbers of PDSCHs scheduled by DCI formats 311-314 are 2, 1, 3, and 2, DCI formats 311-314 may respectively indicate DAIs (e.g., counter DAIs) having the values of 2, 3, 6, and 8. In the case that the UE receives DCI formats 311, 312, and 314, but misses DCI format 313, the UE can identify that DCI format 313 schedules 3 PDSCHs based on the respective DAI values (e.g., "3" and "8") of DCI formats 312 and 314. As a result, the UE may generate a HARQ-ACK codebook {a0, a1, b0, NACK, NACK, NACK, d0, d1}.

Clearly, compared to the per-PDCCH counted DAI, the per-PDSCH counted DAI can save signaling overhead since the number of HARQ-ACK information bits depends on the number of practically scheduled PDSCHs, instead of the maximum number of PDSCHs that can be scheduled by a single DCI format.

With the increase of the PDSCH number that can be scheduled by a single DCI format, the bit width of the counter DAI and total DAI may need to be increased. For example, in order to identify an error case where at most 3 consecutive DCI formats are missed, the bit width of the counter DAI and total DAI may need to be increased for all serving cells including a serving cell not configured with multi-slot PDSCH scheduling. For example, a 2-bit counter DAI may need to be increased to 5 bits and a 2-bit total DAI may need to be increased to 5 bits when a single DCI format can schedule up to 8 PDSCHs.

When the per-PDSCH counted DAI (e.g., counter DAI and total DAI) is employed, how to indicate such DAI in a fallback DCI format (e.g., DCI format 1_0) would become a problem. A fallback DCI format may not need to support multi-slot PDSCH scheduling. A fallback DCI format may schedule a maximum of one PDSCH on a serving cell of a UE. For example, a fallback DCI format may be used to schedule a single PDSCH or indicate semi-persistent scheduling (SPS) PDSCH release. When the HARQ-ACK feedback for a single PDSCH or SPS PDSCH release scheduled by a fallback DCI format is to be multiplexed with the HARQ-ACK feedback for other PDSCHs scheduled by a non-fallback DCI format(s) (e.g., DCI format 1_1) supporting scheduling one or more PDSCHs, the fallback DCI format may need to indicate a DAI value matching that of the non-fallback DCI format(s). Since there is only, for example, a 2-bit DAI (e.g., counter DAI) in a fallback DCI format (e.g., DCI format 1_0) and it is not possible to include, for example, a 5-bit DAI in the fallback DCI format, it would be problematic to indicate the accumulative number of PDSCH transmissions based on the 2-bit DAI of the fallback DCI format and to guarantee that the values of DAIs indicated in the fallback DCI format and other DCI formats that can schedule a plurality of PDSCHs are matched.

For example, referring to FIG. 3, assuming that the numbers of PDSCHs scheduled by DCI formats 311-314 are 2, 1, 3, and 2, DCI formats 311-313 are non-fallback DCI formats which can support a relatively large size (e.g., 3, 4, or 5 bits) DAI, while DCI format 314 is a fallback DCI format which only indicates a relatively small size (e.g., 2 bits) DAI, it may not be possible for the small size DAI to indicate an accumulative number of scheduled PDSCHs up to the current DCI format (e.g., DCI format 314). Tat is, it is not possible to use 2 bits to represent the value of 8 (i.e., 2+1+3+2).

Embodiments of the present disclosure provide solutions to solve the above issues. For example, solutions for determining a HARQ-ACK codebook are proposed. Various methods for indicating the DAI in a DCI format are proposed. More details on the embodiments of the present disclosure will be illustrated in the following text in combination with the appended drawings.

In some embodiments of the present disclosure, when a UE is configured with a TDRA table allowing multi-slot PDSCH scheduling (e.g., at least one entry of the TDRA table indicates more than one start and length indicator value (SLIV) for PDSCH scheduling), the UE may generate a HARQ-ACK codebook including two HARQ-ACK sub-codebooks corresponding to different types of DCI formats (e.g., non-fallback DCI format and fallback DCI format).

For instance, the UE may receive two sets of DCI formats (e.g., a set of DCI formats #1 and a set of DCI formats #2). The set of DCI formats #1 (e.g., non-fallback DCI formats) may schedule a group of PDSCHs (PDSCH group #1), and the set of DCI formats #2 (e.g., fallback DCI formats) may schedule another group of PDSCHs (PDSCH group #2). Each DCI format #1 may schedule at least one PDSCH on a serving cell of the UE and may indicate a DAI (hereinafter, "DAI #1"). Each DCI format #2 may schedule a maximum of one PDSCH on a serving cell of the UE and may indicate a DAI (hereinafter, "DAI #2"). In some examples, a DCI format #2 may schedule a single PDSCH. In some examples, a DCI format #2 may indicate SPS PDSCH release.

The HARQ-ACK feedback for PDSCH group #2 scheduled by the set of DCI formats #2 may be indicated to be multiplexed with the HARQ-ACK feedback for PDSCH group #1 scheduled by the set of DCI formats #1. The UE may generate a HARQ-ACK codebook including, for example, sub-codebook #1 and sub-codebook #2. Sub-codebook #1 may include HARQ-ACK information bits for PDSCH group #1 scheduled by the set of DCI formats #1;

and sub-codebook #2 may include HARQ-ACK information bits for PDSCH group #2 scheduled by the set of DCI formats #2. In some examples, sub-codebook #1 is placed in the front of the HARQ-ACK codebook, followed by sub-codebook #2. In some examples, sub-codebook #2 is placed in the front of the HARQ-ACK codebook, followed by sub-codebook #1.

DAI #1 and DAI #2 may be updated separately. i.e., counted independently. For example, among the set of DCI formats #1, DAI #1 may be used to count the accumulative number of transmitted PDSCHs among PDSCH group #1. The specific definition of DAI #1 will be described in the following text. Among the set of DCI formats #2, DAI #2 may be used to count the accumulative number of PDCCHs carrying the DCI formats #2.

In this way, the number of bits of DAI #2 can be smaller than the number of bits of DAI #1. For example, DAI #2 in a DCI format #2 may include two bits. For instance, a DCI format #2 may include a two-bit DAI field indicating DAI #2. The number of bits of DAI #1 may be determined based on the maximum number of PDSCHs that can be scheduled by DCI format #1. For instance, DCI format #1 may include an N-bit DAI field indicating DAI #1, wherein N may be equal to 3, 4, or 5.

One of the following definitions of DAI #1 in DCI format #1 may be applied to the above embodiments.

In some embodiments, DAI #1 may indicate the accumulative number of dynamically scheduled PDSCHs plus the number of PDCCH transmission(s) for SPS PDSCH release. In these embodiments, the SPS PDSCH is not counted in the accumulative number of PDSCHs indicated by DAI #1.

In some other embodiments, DAI #1 may indicate the accumulative number of PDSCHs (including dynamically scheduled PDSCH(s) and SPS PDSCH(s)) plus the number of PDCCH transmission(s) for SPS PDSCH release. In these embodiments, the SPS PDSCH is counted in the accumulative number of PDSCHs indicated by DAI #1.

In some other embodiments, DAI #1 may indicate the accumulative number of dynamically scheduled PDSCHs. In these embodiments, DCI format #1 is not used for indicating DL SPS release. DCI format #2 is used for indicating DL SPS release. In addition, the SPS PDSCH is not counted in the accumulative number of PDSCHs indicated by DAI #1.

In yet other embodiments, DAI #1 may indicate the accumulative number of PDSCHs (including dynamically scheduled PDSCH(s) and SPS PDSCH(s)). In these embodiments, DCI format #1 is not used for indicating DL SPS release. DCI format #2 is used for indicating DL SPS release.

Figure 4:
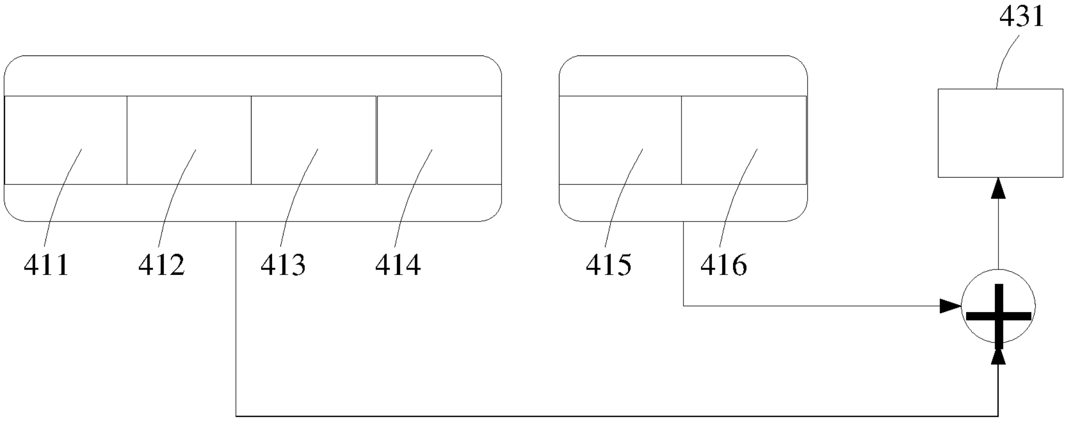
FIG. 4 illustrates a schematic diagram of HARQ-ACK codebook determination in accordance with some embodiments of the present disclosure.

FIG. 4 illustrates a schematic diagram of HARQ-ACK codebook determination in accordance with some embodiments of the present disclosure. Details described in all of the foregoing embodiments of the present disclosure are applicable for the embodiments shown in FIG. 4. For example, in FIG. 4, DCI formats 411-414 are non-fallback DCI formats and DCI formats 415 and 416 are fallback DCI formats. The above descriptions with respect to DCI format #1 and DCI format #2 may apply to DCI formats 411-414 and DCI formats 415 and 416, respectively.

In the example of FIG. 4, it is assumed that the UE is configured with a single serving cell and a non-fallback DCI format can schedule a maximum of 4 PDSCHs with each PDSCH carrying a different TB. It should be understood that FIG. 4 is only for illustrative purposes, and should not be construed as limiting the embodiments of the present disclosure.

When a non-fallback DCI format can schedule a maximum of 4 PDSCHs, 4 bits may be required for indicating the value of the DAI (hereinafter, "Y") in the non-fallback DCI format. These 4 bits in the non-fallback DCI format (e.g., DCI formats 411-414) can indicate a DAI value having a range from 1 to 16. When Y exceeds 16, a modular operation, for example, X=Y mod 16, may be performed by the BS, and the value of X is then indicated in the above-mentioned 4 bits in the non-fallback DCI format.

For example, it is assumed that DCI formats 411-414 respectively schedule 2, 3, 4, and 4 PDSCHs on a serving cell of a UE. The BS may indicate corresponding DAI values in DCI formats 411-414 according to the accumulative number of PDSCHs on the serving cell. Therefore, the value of DAIs to be indicated in DCI formats 411-414 may equal 2, 5, 9, and 13, respectively.

Each of DCI formats 415 and 416 can schedule a maximum of 1 PDSCH. The BS may indicate the DAI values in DCI formats 415 and 416 according to the accumulative number of PDCCHs carrying the corresponding DCI formats. The value of DAIs in DCI formats 415 and 416 may thus equal 1 and 2, respectively. Each of DCI formats 415 and 416 may include 2 bits for indicating the value of the corresponding DAI.

At the UE side, based on the 4-bit DAI in DCI formats 411-414, the UE can derive the number of scheduled PDSCHs, and generate HARQ-ACK information bit(s) for each scheduled PDSCH. The generated HARQ-ACK information bits may be included in a sub-codebook and may be ordered according to, for example, the ascending or descending order of the 4-bit DAIs. Based on the 2-bit DAI in DCI formats 415 and 416, the UE can derive the number of transmitted PDCCHs and scheduled PDSCHs, and generate HARQ-ACK information bit(s) for each scheduled PDSCH. The generated HARQ-ACK information bits may be included in another sub-codebook and may be ordered according to, for example, the ascending or descending order of the 2-bit DAIs. The above two sub-codebooks may then be concatenated and transmitted in PUCCH 431.

In some embodiments of the present disclosure, when a UE is configured with a TDRA table allowing multi-slot PDSCH scheduling (e.g., at least one entry of the TDRA table indicates more than one SLIV for PDSCH scheduling), the UE may generate a single HARQ-ACK codebook. The DAI may be counted jointly among different types of DCI formats (e.g., non-fallback DCI format and fallback DCI format).

For instance, the UE may receive two sets of DCI formats (e.g., a set of DCI formats #1A and a set of DCI formats #2A). Each DCI format #1A (e.g., non-fallback DCI format) may schedule at least one PDSCH on a serving cell of the UE. Each DCI format #2A (e.g., fallback DCI format) may schedule a maximum of one PDSCH on the serving cell of the UE. In some examples, a DCI format #2A may schedule a single PDSCH. In some examples, a DCI format #2A may indicate SPS PDSCH release. The HARQ-ACK feedback for PDSCHs scheduled by the set of DCI formats #1A may be indicated to be multiplexed with the HARQ-ACK feedback for PDSCHs scheduled by the set of DCI formats #2A.

Each of DCI format #1A and DCI format #2A may indicate a DAI (hereinafter. "DAI #1A"). DAI #1A may indicate an accumulative number of PDSCH transmissions among the PDSCHs scheduled by the set of DCI formats #1A and the set of DCI formats #2A. The definitions of DAI #1 as described above may also be applied to DAI #1A. The UE can generate HARQ-ACK information bit(s) for each PDSCH scheduled by the set of DCI formats #1A and the set of DCI formats #2A. The generated HARQ-ACK information bits may be included in a HARQ-ACK codebook and ordered according to, for example, the ascending or descending order of the values of DAIs #1A.

The number of bits of DAI #1A may be determined based on the maximum number of PDSCHs that can be scheduled by DCI format #1A. For instance, the number of bits of DAI #1A (hereinafter, "M") may be equal to 3, 4, or 5.

DCI format #1A may include a specific field for indicating the value of DAI #1A. That is, the bitwidth of this specific field is equal to M. For example, the bitwidth of a DAI field in DCI format #1A may be increased from 2 bit to M bits. However, in order to not increase the payload size of DCI format #2A, DCI format #2A may use a DAI field combined with another field in DCI format #2A to indicate the value of DAI #1A. The bitwidth of the DAI field and the another field may be greater than or equal to M.

For instance, when a DCI format #1A can schedule a maximum of 8 PDSCHs, 5 bits (e.g., M=5) may be required for indicating the value of DAI #1A (hereinafter, "Y1"). These 5 bits can indicate a DAI value having a range from 1 to 32. When Y1 exceeds 32, a modular operation, for example, X1=Y1 mod 32, may be performed by the BS. The value of X1 may be indicated in the M-bit DAI field of DCI format #1A or be indicated by the combination of the DAI field and the another field of DCI format #2A.

In some examples, the another field may be a PUCCH resource indicator (PRI) field. The PRI field may be used to indicate one or more least significant bits (LSBs) or most significant bits (MSBs) of DAI #1A that cannot be accommodated by the DAI field. When the total number of bits of the DAI field and PRI field of DCI format #2A is greater than the number of bits of DAI #1A, a part of the PRI field of DCI format #2A may be used for jointly indicating the value of DAI #1A. The remaining bit(s) of the PRI field may still be used to indicate the PRI. Alternatively, the remaining bit(s) of the PRI field may be ignored.

For instance. DCI format #2A may reuse a 3-bit PRI field combined with a 2-bit DAI field to indicate DAI #1A. Therefore, there are a maximum of 5 bits that can be used to indicate DAI #1A. When M=4, only 2 bits of the PRI field are used to indicate the DAI #1A and the remaining 1 bit of the PRI field may be used to indicate the PRI (e.g., the LSB or the MSB of the PRI).

When the last received DCI format among the set of DCI formats #1A and the set of DCI formats #2A is a DCI format #2A, the UE may assume that the PRI in the last received DCI format #1A indicates the latest PUCCH resource. That is, the UE may apply the PRI field in the last received DCI format #1A among the set of DCI formats #1A as the latest PRI.

In some examples, the another field may be a transmit power control (TPC) field. The TPC field may be used to indicate one or more LSBs or MSBs of DAI #1A that cannot be accommodated by the DAI field. When the total number of bits of the DAI field and TPC field of DCI format #2A is greater than the number of bits of DAI #1A, a part of the TPC field of DCI format #2A may be used for jointly indicating the value of DAI #1A. The remaining bit(s) of the TPC field may still be used to indicate the TPC adjustment command. Alternatively, the remaining bit(s) of the TPC field may be ignored.

For instance, DCI format #2A may reuse a 2-bit TPC field combined with a 2-bit DAI field to indicate DAI #1A. Therefore, there are a maximum of 4 bits that can be used to indicate DAI #1A. When M=4, all bits in the TPC field are used to indicate the DAI #1A. When M=3, only 1 bit of the TPC field are used to indicate the DAI #1A and the remaining 1 bit of the TPC field may be used to indicate the TPC adjustment command (e.g., the LSB or the MSB of the TPC adjustment command).

When the last received DCI format among the set of DCI formats #1A and the set of DCI formats #2A is a DCI format #2A, the UE may assume that the TPC in the last received DCI format #1A indicates the latest TPC adjustment command. That is, the UE may apply the TPC field in the last received DCI format #1A among the set of DCI formats #1A as the latest TPC adjustment command.

In some embodiments of the present disclosure, instead of indicating the DAI #1A by a combination of a DAI field and another field, DCI format #2A may use the DAI field to indicate a part of DAI #1A. In some examples, the DAI field of DCI format #2A may indicate a number of LSBs (e.g., 2 LSBs) of the value of DAI #1A.

From a UE's perspective, the UE does not expect to receive a plurality of consecutive DCI formats #2A with HARQ-ACK feedback for the scheduled PDSCHs to be multiplexed in the same HARQ-ACK codebook with HARQ-ACK feedback for the PDSCHs scheduled by one or more DCI formats #1A. For example, the UE may not consecutively receive any two DCI formats #2A of the set of DCI formats #2A. For instance, after the UE receives one DCI format #2A (e.g., DCI format $\#2A_i$), the UE may receive at least one DCI format #1A before receiving another DCI format #2A (e.g., DCI format $\#2A_{i+1}$), or DCI format $\#2A_i$ is the last DCI format received by the UE among the set of DCI formats #1A and the set of DCI formats #2A. From the BS's perspective, it may not consecutively transmit any two DCI formats #2A of the set of DCI formats #2A to the UE.

Figure 5:
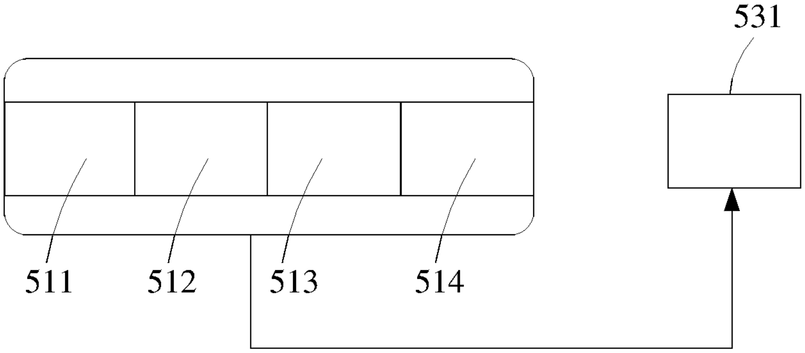
FIG. 5 illustrates a schematic diagram of HARQ-ACK codebook determination in accordance with some embodiments of the present disclosure.

FIG. 5 illustrates a schematic diagram of HARQ-ACK codebook determination in accordance with some embodiments of the present disclosure. Details described in all of the foregoing embodiments of the present disclosure are applicable for the embodiments shown in FIG. 5. For example, in FIG. 5, DCI formats 511, 513, and 514 are non-fallback DCI formats and DCI format 512 is a fallback DCI format. The above descriptions with respect to DCI format #1A may apply to DCI formats 511, 513, and 514, and the above descriptions with respect to DCI format #2A may apply to DCI format 512.

In the example of FIG. 5, it is assumed that the UE is configured with a single serving cell and a non-fallback DCI format can schedule a maximum of 4 PDSCHs with each PDSCH carrying a different TB. It should be understood that FIG. 5 is only for illustrative purposes, and should not be construed as limiting the embodiments of the present disclosure.

When a non-fallback DCI format can schedule a maximum of 4 PDSCHs, 4 bits may be required for indicating the value of the DAI (hereinafter, "Y2") in the non-fallback DCI format. These 4 bits in the non-fallback DCI format (e.g., DCI formats 511, 513, and 514) can indicate a DAI value having a range from 1 to 16. When Y2 exceeds 16, a modular operation, for example, X2=Y2 mod 16, may be performed by the BS, and the value of X2 is then indicated in the above-mentioned 4 bits in the non-fallback DCI format.

For example, it is assumed that DCI formats 511, 513, and 514 respectively schedule 2, 4, and 4 PDSCHs on a serving cell of a UE, and DCI format 512 schedules one PDSCH on the serving cell. The BS may indicate corresponding DAI values in DCI formats 511-514 according to the accumulative number of PDSCHs on the serving cell. Therefore, the value of DAIs to be indicated in DCI formats 511-514 may equal 2, 3, 7, and 11, respectively. In some examples, the 4-bit DAI fields in DCI formats 511, 513, and 514 may be "0001," "0110." and "1010," respectively. The 2-bit DAI field in DCI format 512 may be "10," which includes the two LSBs of "0010."

At the UE side, based on the 4-bit DAI fields in DCI formats 511, 513, and 514 and 2-bit DAI field in DCI format 512, the UE can derive the number of scheduled PDSCHs, and generate HARQ-ACK information bit(s) for each scheduled PDSCH. Since a fallback DCI format has a relative high reliability, the missing problem of the fallback DCI format may not be taken into account. In the case that one of DCI formats 511, 513, and 514 is missed, the UE can still derive the number of PDSCHs scheduled by the missed DCI format. For example, when DCI format 511 is missed, the UE can derive the number of PDSCHs scheduled by DCI format 511 based on the 2-bit DAI field in DCI format 512. That is, the number of PDSCHs scheduled by DCI format 511 is 2 (e.g., the DAI value indicated by DCI format 512 minus the number of PDSCHs scheduled by DCI format 512).

In this way, the UE can generate HARQ-ACK information bit(s) for each PDSCH scheduled by DCI formats 511-514. The generated HARQ-ACK information bits may be included in a HARQ-ACK codebook and ordered according to, for example, the ascending or descending order of the values of DAIs #1A. The HARQ-ACK codebook may be transmitted in PUCCH 531.

In some examples, a modular operation (e.g., $$V_{C-DAI}^{DL}$$

mod P) may be applied to the value of DAI #1A, wherein $$V_{C-DAI}^{DL}$$

denotes the value of DAI #1A and P denotes the number of different values that can be indicated by the DAI field of DCI format #2A. The result of the modular operation may be indicated in the DAI field of DCI format #2A. For example, assuming that DCI format #2A includes a 2-bit DAI field, Table 2 below shows examples of values of the 2-bit DAI field corresponding to the values of DAI #1A. It should be understood that Table 2 is only for illustrative purposes, and should not be construed as limiting the embodiments of the present disclosure.

TABLE 2

Examples of values of a DAI field

| DAI field (MSB, LSB) | $V_{C-DAI}^{DL}$ |
|---|---|
| 0, 0 | 1, 5, 9, 13, 17, 21, . . . |
| 0. 1 | 2. 6, 10, 14, 18, 22, . . . |
| 1, 0 | 3, 7, 11, 15, 19, 23, . . . |
| 1, 1 | 4, 8, 12, 16, 20, 24, . . . |

According to Table 2, when the value of a DAI is equal to 5, a 2-bit DAI field of a DCI format #2A may indicate "00," which corresponds to (5 mod 4).

Figure 6:
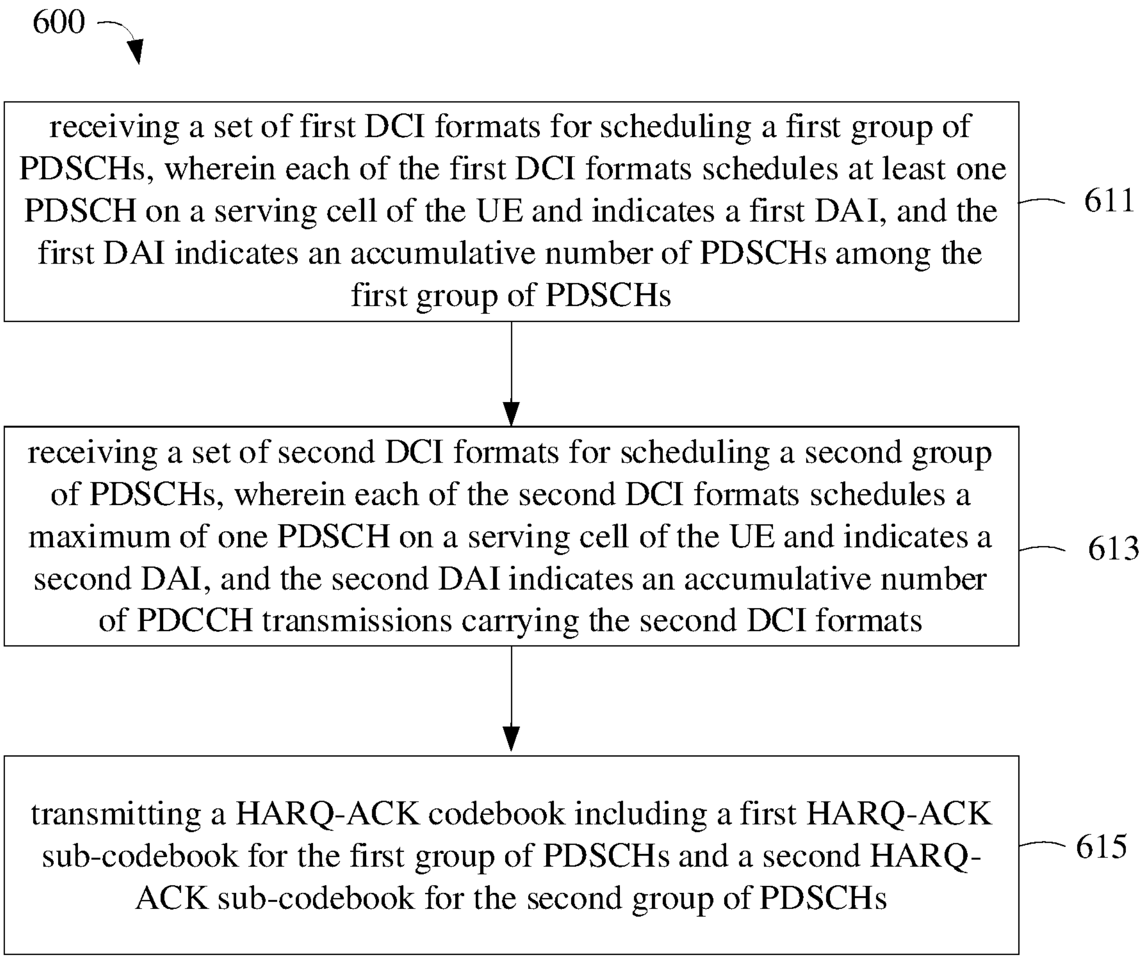
FIG. 6 illustrates a flow chart of an exemplary procedure of wireless communications in accordance with some embodiments of the present disclosure.

FIG. 6 illustrates a flow chart of an exemplary procedure 600 for wireless communications in accordance with some embodiments of the present disclosure. Details described in all of the foregoing embodiments of the present disclosure are applicable for the embodiments shown in FIG. 6. In some examples, the procedure may be performed by a UE, for example, UE 101 in FIG. 1.

Referring to FIG. 6, in operation 611, a UE may receive a set of first DCI formats for scheduling a first group of PDSCHs. Each of the first DCI formats may schedule at least one PDSCH on a serving cell of the UE and may indicate a first DAI. The first DAI may indicate an accumulative number of PDSCHs among the first group of PDSCHs.

In operation 613, the UE may receive a set of second DCI formats for scheduling a second group of PDSCHs. Each of the second DCI formats may schedule a maximum of one PDSCH on a serving cell of the UE and may indicate a second DAI. The second DAI may indicate an accumulative number of PDCCH transmissions carrying the second DCI formats.

The first DAIs of the first DCI formats and the second DAIs of the second DCI formats may be counted independently. The number of bits of the first DAI may be determined based on a maximum number of PDSCHs scheduled by the first DCI format. The number of bits of the second DAI may be smaller than the number of bits of the first DAI.

The first DAI may indicate one of the following: an accumulative number of dynamically scheduled PDSCHs plus the number of PDCCH transmissions for SPS PDSCH release, an accumulative number of dynamically scheduled PDSCHs and SPS PDSCHs plus the number of PDCCH transmissions for SPS PDSCH release; an accumulative number of dynamically scheduled PDSCHs; and an accumulative number of dynamically scheduled PDSCHs and SPS PDSCHs.

For example, the first DCI format and the second DCI format may respectively be DCI format #1 and DCI format #2 as described above. The first DAI and second DAI may respectively be DAI #1 and DAI #2 as described above.

In operation 615, the UE may transmit a HARQ-ACK codebook including a first HARQ-ACK sub-codebook for the first group of PDSCHs and a second HARQ-ACK sub-codebook for the second group of PDSCHs.

In some examples, the first HARQ-ACK sub-codebook may be placed in the front of the HARQ-ACK codebook, followed by the second HARQ-ACK sub-codebook. In some other examples, the second HARQ-ACK sub-codebook may be placed in the front of the HARQ-ACK codebook, followed by the first HARQ-ACK sub-codebook. The first and second HARQ-ACK sub-codebooks may respectively be sub-codebook #1 and sub-codebook #2 as described above.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
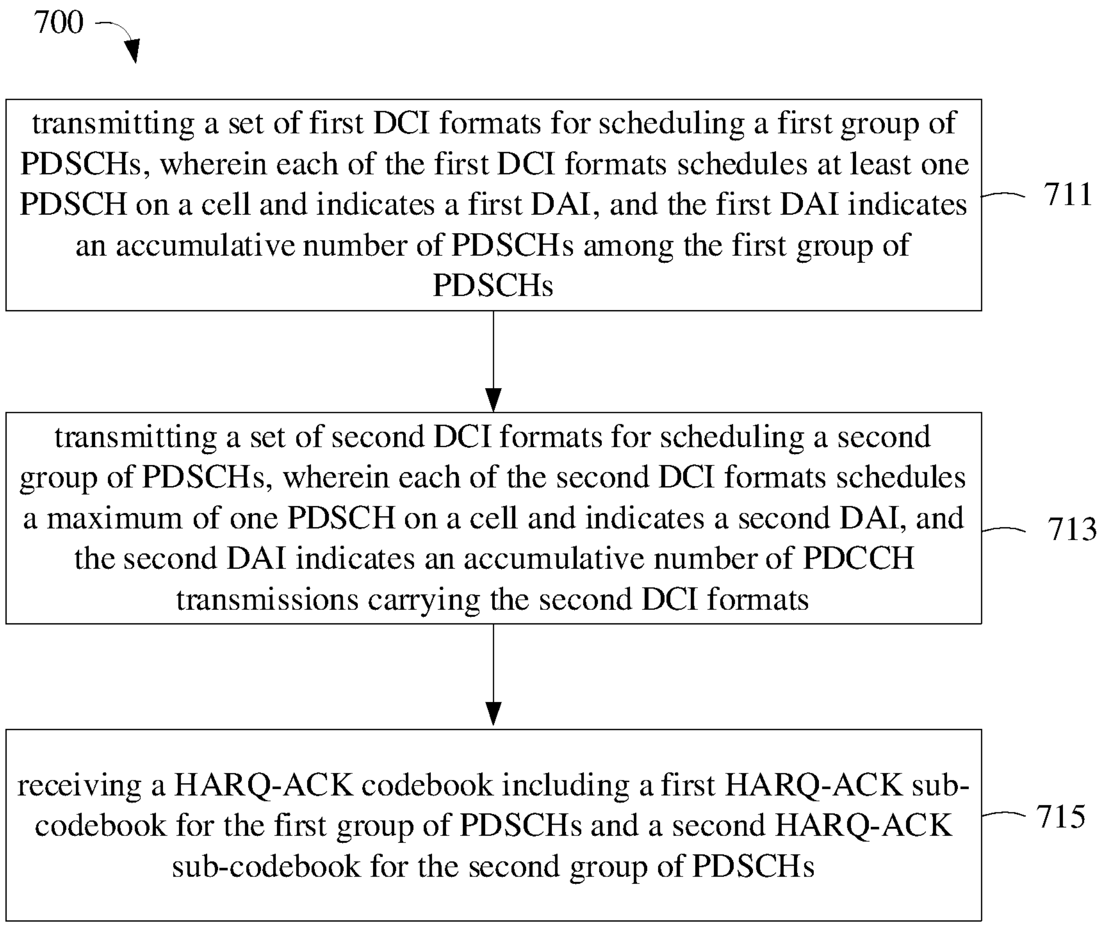
FIG. 7 illustrates a flow chart of an exemplary procedure of wireless communications in accordance with some embodiments of the present disclosure.

FIG. 7 illustrates a flow chart of an exemplary procedure 700 for wireless communications in accordance with some embodiments of the present disclosure. Details described in all of the foregoing embodiments of the present disclosure are applicable for the embodiments shown in FIG. 7. In some examples, the procedure may be performed by a BS, for example, BS 102 in FIG. 1.

Referring to FIG. 7, in operation 711, a BS may transmit a set of first DCI formats for scheduling a first group of PDSCHs. Each of the first DCI formats may schedule at least one PDSCH on a cell and indicate a first DAI. The first DAI may indicate an accumulative number of PDSCHs among the first group of PDSCHs.

In operation 713, the BS may transmit a set of second DCI formats for scheduling a second group of PDSCHs. Each of the second DCI formats may schedule a maximum of one PDSCH on a cell and indicate a second DAI. The second DAI may indicate an accumulative number of PDCCH transmissions carrying the second DCI formats.

The first DAIs of the first DCI formats and the second DAIs of the second DCI formats may be counted independently. The number of bits of the first DAI may be determined based on a maximum number of PDSCHs scheduled by the first DCI format. The number of bits of the second DAI may be smaller than the number of bits of the first DAI.

The first DAI may indicate one of the following: an accumulative number of dynamically scheduled PDSCHs plus the number of PDCCH transmissions for SPS PDSCH release; an accumulative number of dynamically scheduled PDSCHs and SPS PDSCHs plus the number of PDCCH transmissions for SPS PDSCH release; an accumulative number of dynamically scheduled PDSCHs; and an accumulative number of dynamically scheduled PDSCHs and SPS PDSCHs.

For example, the first DCI format and the second DCI format may respectively be DCI format #1 and DCI format #2 as described above. The first DAI and second DAI may respectively be DAI #1 and DAI #2 as described above.

In operation 715, the BS may receive a HARQ-ACK codebook including a first HARQ-ACK sub-codebook for the first group of PDSCHs and a second HARQ-ACK sub-codebook for the second group of PDSCHs.

In some examples, the first HARQ-ACK sub-codebook may be placed in the front of the HARQ-ACK codebook, followed by the second HARQ-ACK sub-codebook. In some other examples, the second HARQ-ACK sub-codebook may be placed in the front of the HARQ-ACK codebook, followed by the first HARQ-ACK sub-codebook. The first and second HARQ-ACK sub-codebooks may respectively be sub-codebook #1 and sub-codebook #2 as described above.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
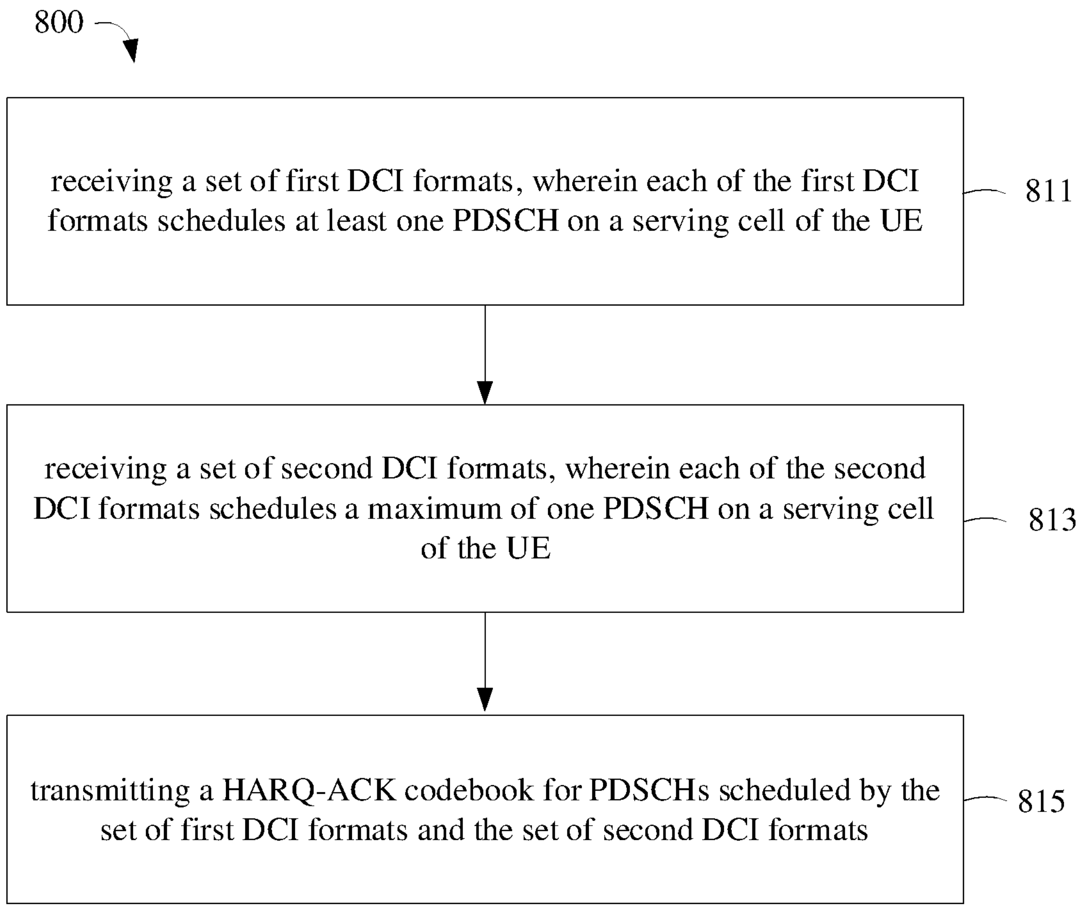
FIG. 8 illustrates a flow chart of an exemplary procedure of wireless communications in accordance with some embodiments of the present disclosure.

FIG. 8 illustrates a flow chart of an exemplary procedure 800 for wireless communications in accordance with some embodiments of the present disclosure. Details described in all of the foregoing embodiments of the present disclosure are applicable for the embodiments shown in FIG. 8. In some examples, the procedure may be performed by a UE, for example, UE 101 in FIG. 1.

Referring to FIG. 8, in operation 811, a UE may receive a set of first DCI formats, wherein each of the first DCI formats may schedule at least one PDSCH on a serving cell of the UE. In operation 813, the UE may receive a set of second DCI formats, wherein each of the second DCI formats may schedule a maximum of one PDSCH on a serving cell of the UE. In operation 815, the UE may transmit a HARQ-ACK codebook for PDSCHs scheduled by the set of first DCI formats and the set of second DCI formats.

In some embodiments, each DCI format of the set of first DCI formats and the set of second DCI formats may indicate a DAI indicating an accumulative number of PDSCHs among the PDSCHs scheduled by the set of first DCI formats and the set of second DCI formats. The DAIs of the first DCI formats and the second DCI formats may be counted jointly. The number of bits of the DAI of the first DCI format may be determined based on a maximum number of PDSCHs scheduled by the first DCI format.

For example, the first DCI format and the second DCI format may respectively be DCI format #1A and DCI format #2A as described above. The DAI may respectively be DAI #1A as described above.

In some embodiments of the present disclosure, the DAI of the second DCI format may be jointly indicated by a DAI field and another field in the second DCI format. The total number of bits of the DAI field and the another field of the second DCI format may be greater than or equal to the number of bits of the DAI of the first DCI format. In response to the total number of bits of the DAI field and the another field of the second DCI format being greater than the number of bits of the DAI field of the first DCI format, the DAI field and a part of the another field of the second DCI format may be used for jointly indicating the value of the DAI of the second DCI format.

In some examples, the another field of the second DCI format may be a PRI field of the second DCI format. In response to the last received DCI format among the set of first DCI formats and the set of second DCI formats being a second DCI format, the UE may apply a PRI field in the last received first DCI format among the set of first DCI formats as the latest PRI.

In some examples, the another field of the second DCI format may be a TPC field of the second DCI format. In response to the last received DCI format among the set of first DCI formats and the set of second DCI formats being a second DCI format, the UE may apply a TPC field in the last received first DCI format among the set of first DCI formats as the latest TPC adjustment command.

In some embodiments of the present disclosure, the second DCI format may include a DAI field. The size of the DAI field (e.g., 2 bit) may be smaller than the number of bits of the DAI. In some examples, the DAI field of the second DCI format may indicate a number of LSBs (e.g., 2 bit) of the value of the DAI. In some examples, the value of the DAI field of the second DCI format may be determined based on a modular operation, for example, ("the value of the DAI" mod "the number of different values that can be indicated by the DAI field"). The UE may receive any two second DCI formats of the set of second DCI formats inconsecutively.

It should be appreciated by persons skilled in the art that the sequence of the operations in exemplary procedure 800 may be changed and some of the operations in exemplary procedure 800 may be eliminated or modified, without departing from the spirit and scope of the disclosure.

Figure 9:
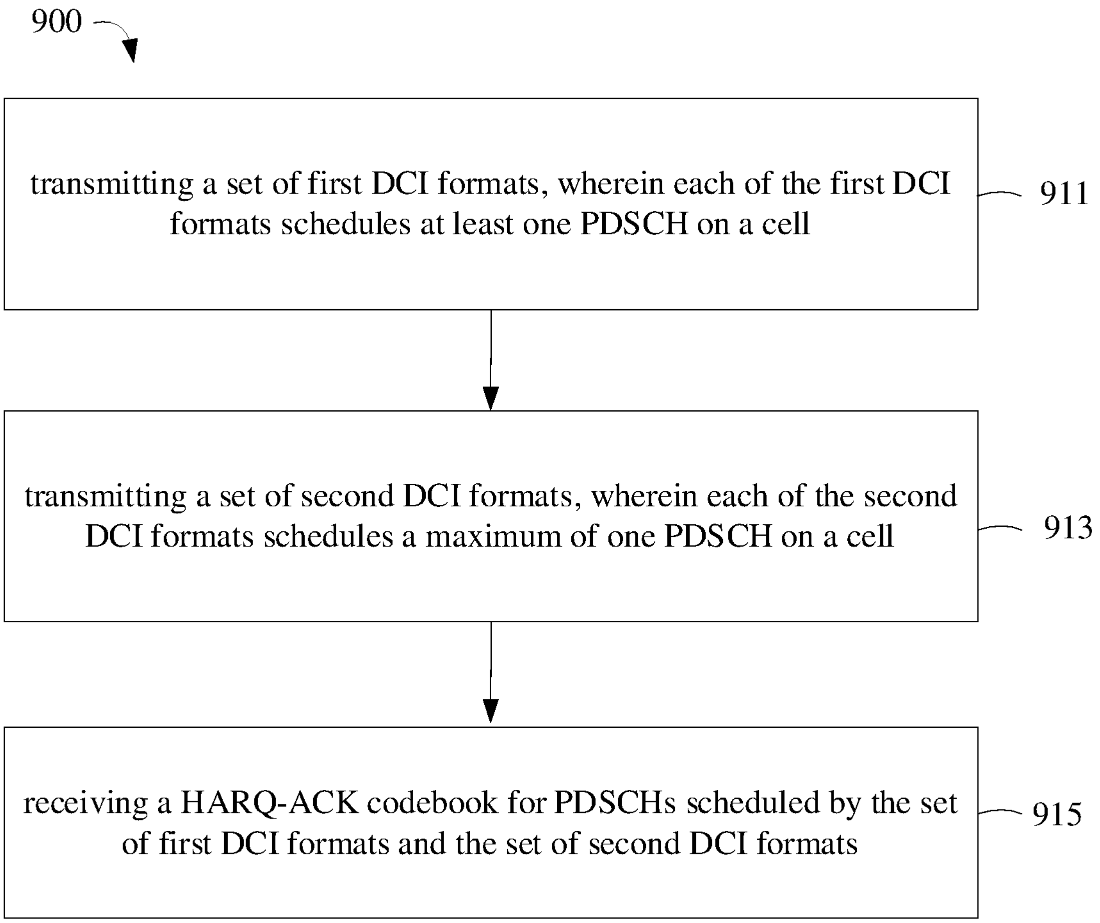
FIG. 9 illustrates a flow chart of an exemplary procedure of wireless communications in accordance with some embodiments of the present disclosure.

FIG. 9 illustrates a flow chart of an exemplary procedure 900 for wireless communications in accordance with some embodiments of the present disclosure. Details described in all of the foregoing embodiments of the present disclosure are applicable for the embodiments shown in FIG. 9. In some examples, the procedure may be performed by a BS, for example, BS 102 in FIG. 1.

Referring to FIG. 9, in operation 911, a BS may transmit a set of first DCI formats, wherein each of the first DCI formats may schedule at least one PDSCH on a cell. In operation 913, the BS may transmit a set of second DCI formats, wherein each of the second DCI formats may schedule a maximum of one PDSCH on a cell. In operation 915, the BS may receive a HARQ-ACK codebook for PDSCHs scheduled by the set of first DCI formats and the set of second DCI formats.

In some embodiments, each DCI format of the set of first DCI formats and the set of second DCI formats may indicate a DAI indicating an accumulative number of PDSCHs among the PDSCHs scheduled by the set of first DCI formats and the set of second DCI formats. The DAIs of the first DCI formats and the second DCI formats may be counted jointly. The number of bits of the DAI of the first DCI format may be determined based on a maximum number of PDSCHs scheduled by the first DCI format.

For example, the first DCI format and the second DCI format may respectively be DCI format #1A and DCI format #2A as described above. The DAI may respectively be DAI #1A as described above.

In some embodiments of the present disclosure, the DAI of the second DCI format may be jointly indicated by a DAI field and another field in the second DCI format. The total number of bits of the DAI field and the another field of the second DCI format may be greater than or equal to the number of bits of the DAI of the first DCI format. In response to the total number of bits of the DAI field and the another field of the second DCI format being greater than the number of bits of the DAI field of the first DCI format, the DAI field and a part of the another field of the second DCI format may be used for jointly indicating the value of the DAI of the second DCI format.

In some examples, the another field of the second DCI format may be a PRI field of the second DCI format. In response to the last received DCI format among the set of first DCI formats and the set of second DCI formats being a second DCI format, the BS may apply a PRI field in the last received first DCI format among the set of first DCI formats as the latest PRI.

In some examples, the another field of the second DCI format may be a TPC field of the second DCI format. In response to the last received DCI format among the set of first DCI formats and the set of second DCI formats being a second DCI format, the BS may apply a TPC field in the last received first DCI format among the set of first DC formats as the latest TPC adjustment command.

In some embodiments of the present disclosure, the second DCI format may include a DAI field. The size of the DAI field (e.g., 2 bit) may be smaller than the number of bits of the DAI. In some examples, the DAI field of the second DCI format may indicate a number of LSBs (e.g., 2 bit) of the value of the DAI. In some examples, the value of the DAI field of the second DCI format may be determined based on a modular operation, for example, ("the value of the DAI" mod "the number of different values that can be indicated by the DAI field"). The BS may transmit any two second DCI formats of the set of second DCI formats inconsecutively.

It should be appreciated by persons skilled in the art that the sequence of the operations in exemplary procedure 900 may be changed and some of the operations in exemplary procedure 900 may be eliminated or modified, without departing from the spirit and scope of the disclosure.

Figure 10:
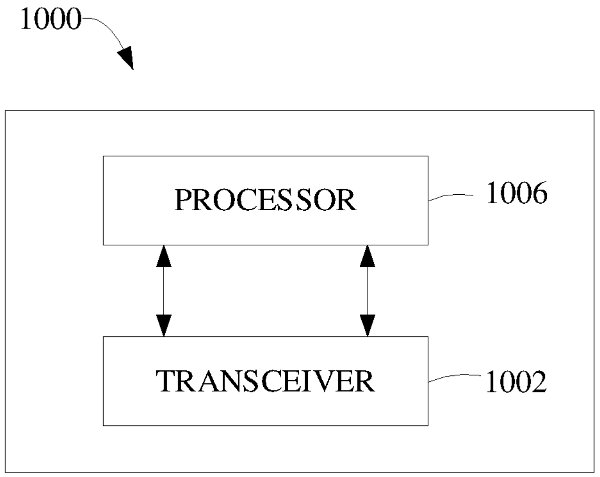
FIG. 10 illustrates a block diagram of an exemplary apparatus in accordance with some embodiments of the present disclosure.

FIG. 10 illustrates a block diagram of an exemplary apparatus 1000 according to some embodiments of the present disclosure. As shown in FIG. 10, the apparatus 1000 may include at least one processor 1006 and at least one transceiver 1002 coupled to the processor 1006. The apparatus 1000 may be a UE or a BS.

Although in this figure, elements such as the at least one transceiver 1002 and processor 1006 are described in the singular, the plural is contemplated unless a limitation to the singular is explicitly stated. In some embodiments of the present application, the transceiver 1002 may be divided into two devices, such as a receiving circuitry and a transmitting circuitry. In some embodiments of the present application, the apparatus 1000 may further include an input device, a memory, and/or other components.

In some embodiments of the present application, the apparatus 1000 may be a UE. The transceiver 1002 and the processor 1006 may interact with each other so as to perform the operations with respect to the UE described in FIGS. 1-9. In some embodiments of the present application, the apparatus 1000 may be a BS. The transceiver 1002 and the processor 1006 may interact with each other so as to perform the operations with respect to the BS described in FIGS. 1-9.

In some embodiments of the present application, the apparatus 1000 may further include at least one non-transitory computer-readable medium.

For example, in some embodiments of the present disclosure, the non-transitory computer-readable medium may have stored thereon computer-executable instructions to cause the processor 1006 to implement the method with respect to the UE as described above. For example, the computer-executable instructions, when executed, cause the processor 1006 interacting with transceiver 1002, so as to perform the operations with respect to the UE described in FIGS. 1-9.

In some embodiments of the present disclosure, the non-transitory computer-readable medium may have stored thereon computer-executable instructions to cause the processor 1006 to implement the method with respect to the BS as described above. For example, the computer-executable instructions, when executed, cause the processor 1006 interacting with transceiver 1002 to perform the operations with respect to the BS described in FIGS. 1-9.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory. EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B. or both A and B. The wording "the first," "the second" or the like is only used to clearly illustrate the embodiments of the present application, but is not used to limit the substance of the present application.

What is claimed:

1. A method performed by a user equipment (UE), the method comprising:

receiving a set of first downlink control information (DCI) formats for scheduling a first group of physical downlink shared channels (PDSCHs), each of the first DCI formats scheduling at least one PDSCH on a serving cell of the UE and indicating a first downlink assignment indicator (DAI), and the first DAI indicating an accumulative number of PDSCHs among the first group of PDSCHs;

receiving a set of second DCI formats for scheduling a second group of PDSCHs, each of the second DCI formats scheduling a maximum of one PDSCH on a serving cell of the UE and indicating a second DAI, and the second DAI indicating an accumulative number of physical downlink control channel (PDCCH) transmissions carrying the set of the second DCI formats; and transmitting a hybrid automatic repeat request acknowledgement (HARQ-ACK) codebook including a first HARQ-ACK sub-codebook for the first group of PDSCHs and a second HARQ-ACK sub-codebook for the second group of PDSCHs.

2. The method of claim 1, wherein DAIs of the first DCI formats and DAIs of the second DCI formats are counted independently.

3. The method of claim 1, wherein the first DAI indicates one of:

an accumulative number of dynamically scheduled PDSCHs plus a number of PDCCH transmissions for semi-persistent scheduling (SPS) PDSCH release;

an accumulative number of dynamically scheduled PDSCHs and SPS PDSCHs plus the number of PDCCH transmissions for SPS PDSCH release;

an accumulative number of dynamically scheduled PDSCHs; and an accumulative number of dynamically scheduled PDSCHs and SPS PDSCHs.

4. The method of claim 1, wherein:

the first HARQ-ACK sub-codebook is placed in a front of the HARQ-ACK codebook, followed by the second HARQ-ACK sub-codebook; or the second HARQ-ACK sub-codebook is placed in the front of the HARQ-ACK codebook, followed by the first HARQ-ACK sub-codebook.

5. A user equipment (UE) for wireless communications, comprising:

at least one memory; and at least one processor coupled with the at least one memory and configured to cause the UE to:

receive a set of first downlink control information (DCI) formats for scheduling a first group of physical downlink shared channels (PDSCHs), each of the first DCI formats scheduling at least one PDSCH on a serving cell of the UE and indicating a first downlink assignment indicator (DAI), and the first DAI indicating an accumulative number of PDSCHs among the first group of PDSCHs;

receive a set of second DCI formats for scheduling a second group of PDSCHs, each of the second DCI formats scheduling a maximum of one PDSCH on a serving cell of the UE and indicating a second DAI, and the second DAI indicating an accumulative number of physical downlink control channel (PDCCH) transmissions carrying the set of the second DCI formats; and transmit a hybrid automatic repeat request acknowledgement (HARQ-ACK) codebook including a first HARQ-ACK sub-codebook for the first group of PDSCHs and a second HARQ-ACK sub-codebook for the second group of PDSCHs.

6. The UE of claim 5, wherein DAIs of the first DCI formats and DAIs of the second DCI formats are counted independently.

7. The UE of claim 6, wherein a number of bits of the second DAI is smaller than the number of bits of the first DAI.

8. The UE of claim 5, wherein a number of bits of the first DAI is determined based on a maximum number of PDSCHs scheduled by the first DCI format.

9. The UE of claim 5, wherein the first DAI indicates one of:

an accumulative number of dynamically scheduled PDSCHs plus a number of PDCCH transmissions for semi-persistent scheduling (SPS) PDSCH release;

an accumulative number of dynamically scheduled PDSCHs and SPS PDSCHs plus the number of PDCCH transmissions for SPS PDSCH release;

an accumulative number of dynamically scheduled PDSCHs; and an accumulative number of dynamically scheduled PDSCHs and SPS PDSCHs.

10. The UE of claim 5, wherein:

the first HARQ-ACK sub-codebook is placed in a front of the HARQ-ACK codebook, followed by the second HARQ-ACK sub-codebook; or the second HARQ-ACK sub-codebook is placed in the front of the HARQ-ACK codebook, followed by the first HARQ-ACK sub-codebook.

11. The UE of claim 5, wherein a number of bits of the second DAI is smaller than the number of bits of the first DAI.

12. A processor for wireless communications, comprising:

at least one controller coupled with at least one memory and configured to cause the processor to:

receive a set of first downlink control information (DCI) formats for scheduling a first group of physical downlink shared channels (PDSCHs), each of the first DCI formats scheduling at least one PDSCH on a serving cell of a user equipment (UE) that includes the processor and indicating a first downlink assignment indicator (DAI), and the first DAI indicating an accumulative number of PDSCHs among the first group of PDSCHs;

receive a set of second DCI formats for scheduling a second group of PDSCHs, each of the second DCI formats scheduling a maximum of one PDSCH on a serving cell of the UE and indicating a second DAI, and the second DAI indicating an accumulative number of physical downlink control channel (PDCCH) transmissions carrying the set of the second DCI formats; and transmit a hybrid automatic repeat request acknowledgement (HARQ-ACK) codebook including a first HARQ-ACK sub-codebook for the first group of PDSCHs and a second HARQ-ACK sub-codebook for the second group of PDSCHs.

13. The processor of claim 12, wherein DAIs of the first DCI formats and DAIs of the second DCI formats are counted independently.

14. The processor of claim 12, wherein a number of bits of the first DAI is determined based on a maximum number of PDSCHs scheduled by the first DCI format.

15. The processor of claim 12, wherein the first DAI indicates one of:

an accumulative number of dynamically scheduled PDSCHs plus a number of PDCCH transmissions for semi-persistent scheduling (SPS) PDSCH release;

an accumulative number of dynamically scheduled PDSCHs and SPS PDSCHs plus the number of PDCCH transmissions for SPS PDSCH release;

an accumulative number of dynamically scheduled PDSCHs; and an accumulative number of dynamically scheduled PDSCHs and SPS PDSCHs.

16. The processor of claim 12, wherein:

the first HARQ-ACK sub-codebook is placed in a front of the HARQ-ACK codebook, followed by the second HARQ-ACK sub-codebook; or the second HARQ-ACK sub-codebook is placed in the front of the HARQ-ACK codebook, followed by the first HARQ-ACK sub-codebook.

17. A base station for wireless communications, comprising:

at least one memory; and at least one processor coupled with the at least one memory and configured to cause the base station to:

transmit a set of first downlink control information (DCI) formats for scheduling a first group of physical downlink shared channels (PDSCHs), each of the first DCI formats scheduling at least one PDSCH on a cell and indicating a first downlink assignment indicator (DAI), and the first DAI indicating an accumulative number of PDSCHs among the first group of PDSCHs;

transmit a set of second DCI formats for scheduling a second group of PDSCHs, each of the second DCI formats scheduling a maximum of one PDSCH on a cell and indicating a second DAI, and the second DAI indicating an accumulative number of physical downlink control channel (PDCCH) transmissions carrying the set of the second DCI formats; and receive a hybrid automatic repeat request acknowledgement (HARQ-ACK) codebook including a first HARQ-ACK sub-codebook for the first group of PDSCHs and a second HARQ-ACK sub-codebook for the second group of PDSCHs.

18. The base station of claim 17, wherein DAIs of the first DCI formats and DAIs of the second DCI formats are counted independently.

19. The base station of claim 17, wherein the first DAI indicates one of:

an accumulative number of dynamically scheduled PDSCHs plus a number of PDCCH transmissions for semi-persistent scheduling (SPS) PDSCH release;

an accumulative number of dynamically scheduled PDSCHs and SPS PDSCHs plus the number of PDCCH transmissions for SPS PDSCH release;

an accumulative number of dynamically scheduled PDSCHs; and an accumulative number of dynamically scheduled PDSCHs and SPS PDSCHs.

20. The base station of claim 17, wherein:

the first HARQ-ACK sub-codebook is placed in a front of the HARQ-ACK codebook, followed by the second HARQ-ACK sub-codebook; or the second HARQ-ACK sub-codebook is placed in the front of the HARQ-ACK codebook, followed by the first HARQ-ACK sub-codebook.

* * * * *